United States Patent

Young, Jr.

(10) Patent No.: US 10,017,905 B2
(45) Date of Patent: Jul. 10, 2018

(54) SCREED ASSEMBLY FOR ASPHALT PAVING MACHINE

(71) Applicant: Roadtec, Inc., Chattanooga, TN (US)

(72) Inventor: Billy Claxton Young, Jr., Flat Rock, AL (US)

(73) Assignee: Roadtec, Inc., Chattanooga, TN (US)

(*) Notice: Subject to any disclaimer, the term of this patent is extended or adjusted under 35 U.S.C. 154(b) by 0 days.

(21) Appl. No.: 15/622,992

(22) Filed: Jun. 14, 2017

(65) Prior Publication Data

US 2018/0002873 A1 Jan. 4, 2018

Related U.S. Application Data

(60) Provisional application No. 62/357,724, filed on Jul. 1, 2016.

(51) Int. Cl.
*E01C 19/42* (2006.01)
*E01C 19/48* (2006.01)
*F16B 35/06* (2006.01)

(52) U.S. Cl.
CPC .......... *E01C 19/42* (2013.01); *E01C 19/4873* (2013.01); *E01C 2301/10* (2013.01); *F16B 35/06* (2013.01)

(58) Field of Classification Search
CPC ........ E01C 19/42; E01C 19/004; E01C 19/48; E01C 23/01; E01C 2301/04; E01C 2301/20; E01C 2301/10; E01C 19/4873; F16B 35/06
USPC ................................................. 411/383, 384
See application file for complete search history.

(56) References Cited

U.S. PATENT DOCUMENTS

| | | | |
|---|---|---|---|
| 5,397,199 A | 3/1995 | Frampton et al. | |
| 5,855,460 A * | 1/1999 | Brehmer | B60T 17/086 411/14 |
| 5,961,266 A * | 10/1999 | Tseng | F16B 37/12 411/289 |
| RE36,981 E | 12/2000 | Birtchet | |
| 6,318,928 B1 | 11/2001 | Swearingen | |
| 6,963,050 B2 | 11/2005 | Heindtel | |
| 6,981,820 B2 | 1/2006 | Nelson | |
| 7,427,174 B2 | 9/2008 | Dearing | |
| 8,113,737 B2 | 2/2012 | Mahler et al. | |
| 8,113,738 B2 | 2/2012 | Mahler et al. | |
| 8,348,570 B2 * | 1/2013 | Ye | H01L 23/4006 361/704 |
| 8,517,630 B2 | 8/2013 | Graham et al. | |
| 9,151,309 B2 * | 10/2015 | Magno, Jr. | F16B 2/18 |
| 9,181,662 B2 | 11/2015 | Kopacz et al. | |

(Continued)

*Primary Examiner* — Abigail A Risic
(74) *Attorney, Agent, or Firm* — Chambliss, Bahner & Stophel, P.C.

(57) ABSTRACT

A screed assembly for an asphalt paving machine includes a lower screed plate, an upper screed plate and a heating element that is in contact with the lower screed plate. The screed assembly also includes a compression bolt assembly having a primary bolt, a compression bolt and a compression spring. The primary bolt has a through hole, and the compression bolt is adapted to be inserted through the hole of the primary bolt. The compression spring is adapted to be placed over the lower end of the primary bolt, so that the compression bolt assembly may cooperate with the upper screed plate to apply a compression force to the heating element on the lower screed plate.

11 Claims, 4 Drawing Sheets

(56) References Cited

U.S. PATENT DOCUMENTS

| | | | |
|---|---|---|---|
| 2010/0327505 A1* | 12/2010 | Pratt | F16B 13/0858 |
| | | | 269/48.1 |
| 2014/0377003 A1* | 12/2014 | Kopacz | E01C 19/4873 |
| | | | 404/118 |
| 2015/0003914 A1* | 1/2015 | Steinhagen | E01C 19/48 |
| | | | 404/118 |
| 2016/0370268 A1* | 12/2016 | Kondo | H01H 35/006 |
| 2017/0292232 A1* | 10/2017 | Marsolek | E01C 19/48 |

* cited by examiner

SCREED ASSEMBLY FOR ASPHALT PAVING MACHINE

CROSS-REFERENCE TO RELATED APPLICATION

This application claims the benefit of U.S. Provisional Patent Application No. 62/357,724 which was filed on Jul. 1, 2016.

FIELD OF THE INVENTION

The present invention relates generally to asphalt paving machines, and more particularly, to a mechanism for attaching a heating element to a screed plate of the screed assembly of the asphalt paving machine.

BACKGROUND OF THE INVENTION

Asphalt paving material is generally comprised of a mixture of asphalt cement and various size fractions of aggregate materials. Generally such mixture is produced in an asphalt production plant at a temperature within the range of 250-350° F. Paving of a roadway with this hot asphalt paving material is generally carried out by an asphalt paving machine that is supplied with asphalt paving material by a number of supply trucks and/or a material transfer vehicle. A typical asphalt paving machine is self-propelled and driven by a wheeled or tracked drive system. In most such machines, a hopper is located at the front end of the machine to receive asphalt paving material from a truck or material transfer vehicle, and a conveyor system located below the hopper transfers the asphalt paving material from the hopper to a transverse distributing auger assembly that is mounted near the rear of the machine. The transverse distributing auger assembly deposits the asphalt paving material onto and across the roadway or other surface to be paved. A floating screed located at the rear end of the machine behind the distributing auger assembly includes one or more screed plates that directly contact the asphalt paving material adjacent to the distributing auger assembly. The screed assembly imparts a compacting force to the asphalt paving material on the surface to form an asphalt mat.

It is important that the temperature of the asphalt paving material be maintained above a known level (depending on the mix design, ambient temperature and other factors) during the transportation and paving process in order for the asphalt paving material mixture to be properly compacted on the roadway or other surface being paved. Consequently, the screed plates of the floating screed are typically heated to a temperature within the range of 300-400° F. to prevent the asphalt cement portion of the asphalt paving material from congealing or otherwise adhering to the lower surfaces of the screed assembly. Some screed plates are heated by oil or gas burners mounted adjacent to the top side of the screed plates so that the flames from the burners impinge upon the top surfaces of the screed plates. These systems sometimes apply intense heat to localized portions of the screed plates, resulting in uneven heating of the screed plates that allows the asphalt cement to stick to the bottom of the insufficiently heated portions of the screed. In addition, if such a heating system is not carefully controlled, the portions of the screed plate that are overheated may become warped. Furthermore, direct flame heating systems emit smoke and fumes that create unpleasant and even unsafe working conditions for the operator of the screed assembly. Other screed plate heating systems employ a heater which is adapted to heat thermal fluids contained within a reservoir that is mounted directly on top of the screed plates. These systems may provide uniform heating of the screed plates, but they require that the thermal fluid circuit be pressurized to a relatively high pressure, which increases the cost and complexity of the heating system and may result in leaks. Still other screed plate heating systems employ electrical heating elements or coils that directly or indirectly apply heat to the screed plates. Such electrical systems may produce uneven heating similar to that obtained by direct flame heating systems because of the difficulty in maintaining uniform contact between the heating elements and the upper surfaces of the screed plates, especially as the screed twists and flexes to maintain grade across the width of the surface being paved.

In addition to the disadvantages described herein, many of the conventional heating assemblies for heating screed plates are relatively complex and require significant labor and time to make adjustments or to effect repairs. It would be desirable therefore, if a relatively simple heating system could be provided that would provide consistent uniform heat to all parts of the screed plates and would be easy to operate and maintain.

ADVANTAGES OF THE INVENTION

Among the advantages of the invention is that it provides a screed assembly that includes a simple mechanism for attaching a heating element to the screed plate(s) in such a manner that the heating assembly provides consistent uniform heat to all portions of the screed plate(s). Still another advantage of the invention is that it provides screed assembly including an attachment mechanism that is easy to operate and maintain.

Other advantages and features of this invention will become apparent from an examination of the drawings and the ensuing description.

NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic. All methods described herein can be performed in any suitable order unless otherwise specified herein or clearly indicated by context.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity. Several terms are specifically defined herein. These terms are to be given their broadest reasonable construction consistent with such definitions, as follows:

The term "asphalt paving material(s)" refers to a bituminous paving mixture that is comprised of an asphaltic binder and any of various aggregate materials.

The terms "asphalt paving machine", "paving machine" and similar terms refer to a finishing machine for applying asphalt paving material to form an asphalt mat on a roadway, parking lot or similar surface.

The term "paving direction", when used in describing the operation of an asphalt paving machine or the relative position of an asphalt paving machine or a component of such a paving machine, refers to the direction of advance of the asphalt paving machine as the paving operation is carried out.

The terms "front" and "front end" of the asphalt paving machine refer to the end of the machine that leads in the paving direction. When referring to a screed or other component of the asphalt paving machine, the terms "front" and "front end" refer to that portion of the screed or component that is nearer the front end of the asphalt paving machine.

The terms "rear" and "rear end" of the asphalt paving machine refer to the end of the paving machine opposite the front end. When referring to a screed or other component of the asphalt paving machine, the terms "rear" and "rear end" refer to that portion of the screed or component that is nearer the rear end of the paving machine.

The terms "forward" and "in front of", as used herein to describe a relative position or direction on or in connection with an asphalt paving machine or a screed or other component of the paving machine, refer to a relative position towards the front end of the machine.

The terms "rearward", "behind" and "rearwardly", as used herein to describe a relative position or direction on or in connection with an asphalt paving machine or a screed or other component of the paving machine, refer to a relative position or direction towards the rear end of the machine.

The terms "downward" and "downwardly", as used herein to describe a relative direction on or in connection with an asphalt paving machine, a screed of a paving machine or the compression bolt assembly of a screed, refer to a direction towards the roadway that is being paved by the machine.

The terms "lower" and "below", as used herein to describe the relative position of a screed, a compression bolt assembly or a component thereof, refer to a relative position that is in the downward direction.

The terms "upward" and "upwardly", as used herein to describe a relative direction on or in connection with an asphalt paving machine, a screed of a paving machine or the compression bolt assembly of a screed, refer to a direction away from the roadway that is being paved by the machine.

The terms "upper" and "above", as used herein to describe the relative position of a screed, a compression bolt assembly or a component thereof, refer to a relative position that is in the upward direction.

SUMMARY OF THE INVENTION

The invention comprises a screed assembly for an asphalt paving machine that includes an attachment mechanism for securing a heating element to a screed plate. The screed assembly includes a lower screed plate, an upper screed plate and a heating element that is in contact with the lower screed plate. The attachment mechanism comprises a compression bolt assembly which includes a primary bolt, a compression bolt and a compression spring. The primary bolt has a primary bolt through hole, and the compression bolt is adapted to be inserted through the primary bolt through hole. The compression spring is adapted to be placed over the lower end of the primary bolt, and the compression bolt assembly is adapted to cooperate with the upper screed plate to apply a compression force to the heating element on the lower screed plate.

The preferred embodiment of this attachment mechanism comprises a compression bolt assembly that includes a primary bolt, a compression bolt, a spring, a jam nut, an end nut and a bolt foot. The preferred primary bolt has a head, an externally threaded portion, a through hole that is adapted to receive the compression bolt, and an unthreaded lower end below the externally threaded portion. The preferred jam nut is internally threaded so as to be threaded onto the externally threaded portion of the primary bolt. The compression spring of this preferred embodiment is adapted to be placed over the lower end of the primary bolt. The preferred compression bolt has a threaded end portion and a head, and the preferred end nut is internally threaded so as to be threaded onto the threaded end portion of the compression bolt. The preferred bolt foot has a threaded hole that is adapted to receive a portion of threaded end portion of the compression bolt that extends past the end nut. In assembling the preferred compression bolt assembly, the jam nut is threaded onto the primary bolt, and the compression bolt is inserted into the through hole in the primary bolt. The compression spring is placed over the end of the compression bolt extending out of the lower end of the primary bolt, and the threaded end of the compression bolt is threaded into the end nut until the head of the compression bolt contacts the head of the primary bolt. Then, the preferred bolt foot is threaded onto portion of the threaded end of the compression bolt that extends past the end nut, and the end nut is tightened down against the bolt foot. The preferred compression bolt assembly may then be threaded into a threaded hole in the upper screed plate until the bolt foot contacts the heating element on the lower screed plate. The preferred compression bolt assembly may then be further advanced through the hole in the upper screed plate to compress the compression spring by an amount determined to apply a desired predetermined compression force to the heating element on the lower screed plate.

In order to facilitate an understanding of the invention, the preferred embodiment of the invention, as well as the best mode known by the inventor for carrying out the invention, is illustrated in the drawings, and a detailed description thereof follows. It is not intended, however, that the invention be limited to the particular embodiment described or to use in connection with the apparatus illustrated herein. Therefore, the scope of the invention contemplated by the inventor includes all equivalents of the subject matter recited in the claims, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENT OF THE INVENTION

This description of the preferred embodiments of the invention is intended to be read in connection with the accompanying drawings, which are to be considered part of the entire written description of this invention. The drawings are not necessarily to scale, and certain features of the invention may be shown exaggerated in scale or in somewhat schematic form in the interest of clarity and conciseness.

Figure 1:
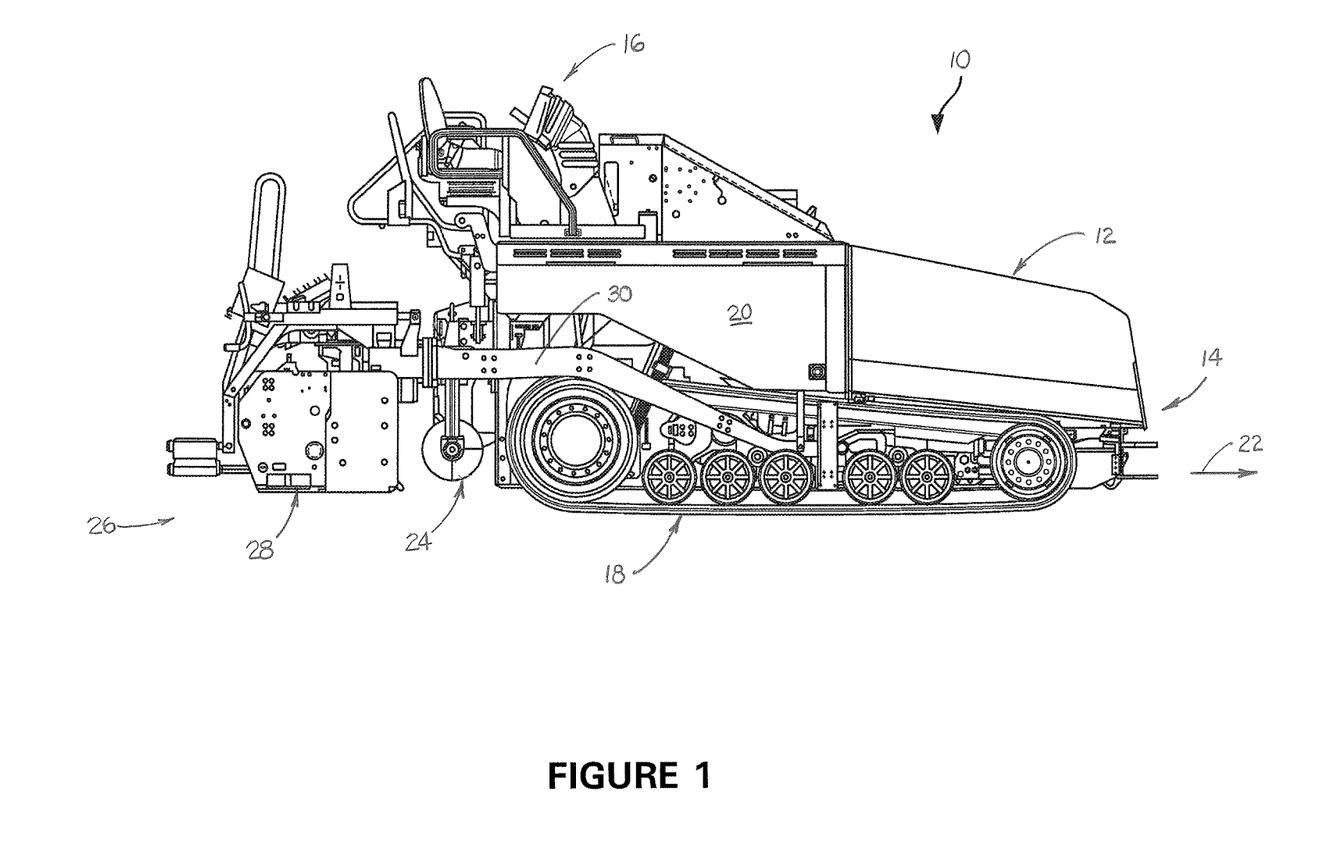
FIG. 1 is a side view of an asphalt paving machine to which a preferred embodiment of the invention may be attached.

Referring now to the drawings, FIG. 1 illustrates asphalt paving machine 10, which includes hopper 12 at its front end 14 for receiving asphalt paving material from a dump truck or a material transfer vehicle. Paving machine 10 also includes operator's station 16, and track drive system 18 that is driven by an engine (not shown), but generally located behind panel 20) so as to move the paving machine during the paving operation in the paving direction indicated by arrow 22. The bottom of hopper 12 is open to one or more hopper conveyors (not shown). Preferably, two slat-type hopper conveyors are mounted in a parallel configuration under the hopper and are adapted to convey asphalt paving material from hopper 12 through a conveyor tunnel under the engine and operator's station to a pair of transverse distributing augers, one of which, right distributing auger 24, is shown in FIG. 1. The distributing augers are located near rear end 26 of paving machine 10 and serve to distribute the asphalt paving material received from the hopper across the width of the roadway or lane to be paved. Floating screed assembly 28 is attached to the paving machine by a pair of tow arms, one of which, tow arm 30, is illustrated in FIG. 1. Screed assembly 28 serves to compact the asphalt paving material and form an asphalt mat on the roadway or other surface being paved.

Referring now to FIGS. 2-6, the screed assembly includes lower screed plate 32, upper screed plate 34 and one or more heating elements 36. Preferably, each heating element 36 comprises a metal component with an internal resistive coil that is operatively connected to a source of electrical power. In other embodiments of the invention, the heating elements may comprise thermal fluid coils that are operatively connected to a source of heated thermal fluid. Other heating elements such as are known to those having ordinary skill in the art to which the invention relates may also be employed. Each heating element is adapted to provide heat by conduction to the underlying lower screed plate so as to heat the plate to a temperature that is preferably within the range of 300-400° F.

Figure 2:
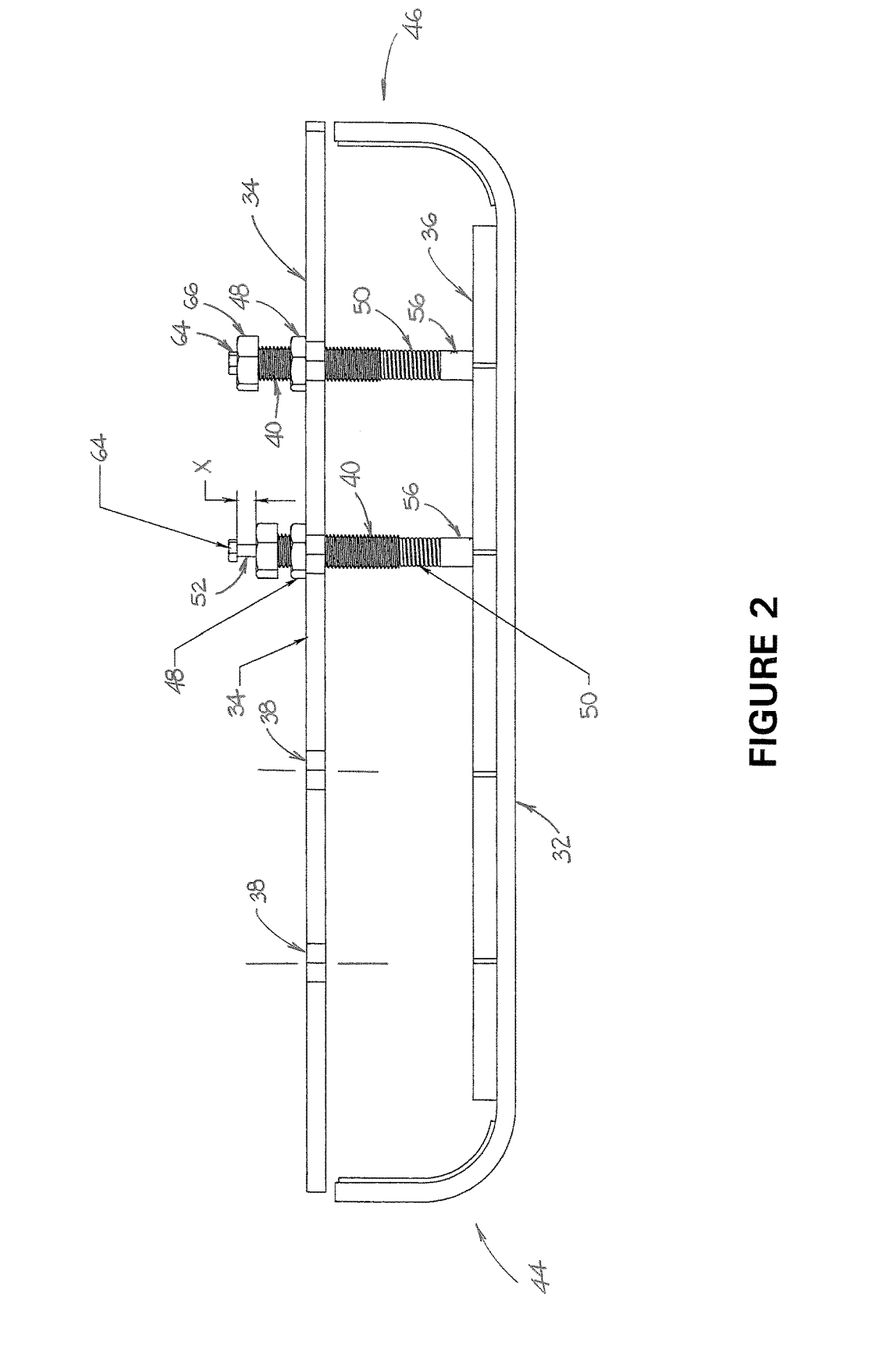
FIG. 2 is a side view of a portion of a preferred screed assembly that is equipped with a heating element and associated attachment mechanisms according to the invention.
Figure 3:
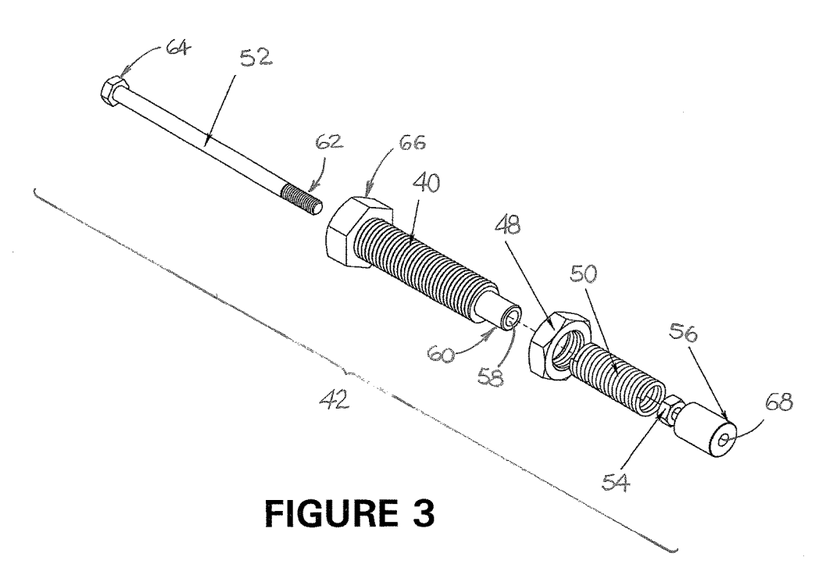
FIG. 3 is an exploded view of the compression bolt assembly that comprises a portion of the preferred embodiment of the invention.

Upper screed plate 34 is provided with a plurality of threaded holes 38, each of which is adapted to receive primary bolt 40 of compression bolt assembly 42. Preferably, as shown in FIG. 2, four threaded holes 38 are spaced across the length of the screed assembly from front end 44 to rear end 46. In addition, this preferred arrangement of through holes 38 is repeated across the width of the screed assembly from the left side to the right side. Preferably, regardless of the width of the screed, three groups of four threaded holes 38 each are spaced across the screed width, with one group being located near the left side of the heating element, one near the right side and one in the middle of the heating element.

Figure 4:
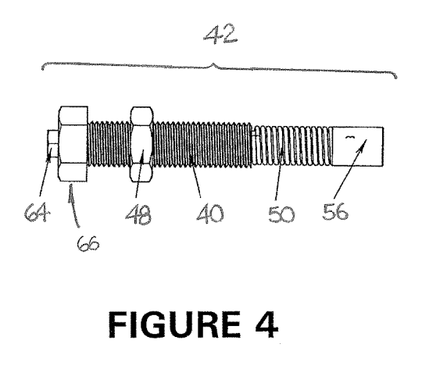
FIG. 4 is a side view of the compression bolt assembly that comprises a portion of the preferred embodiment of the invention.
Figure 5:
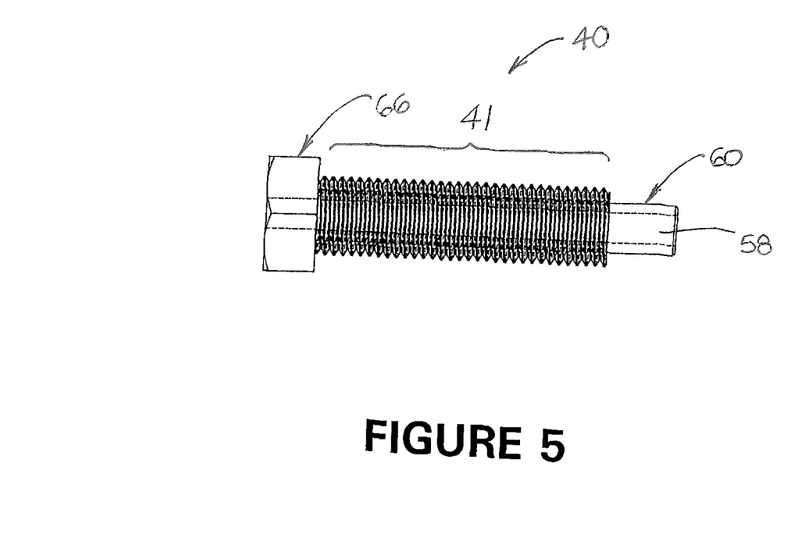
FIG. 5 is a side view of the primary bolt of the compression bolt assembly that is shown in FIGS. 3 and 4.
Figure 6:
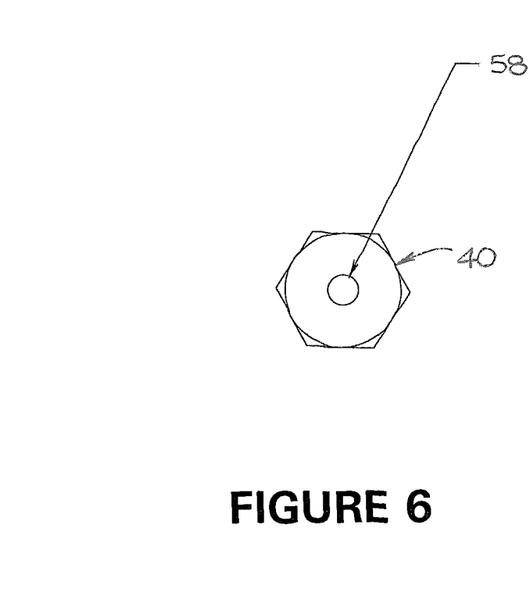
FIG. 6 is a top view of the primary bolt that is shown in FIG. 5.

As shown in FIGS. 2-6, preferred compression bolt assembly 42 also includes (in addition to primary bolt 40) jam nut 48, compression spring 50, compression bolt 52, end nut 54 and bolt foot 56. As best shown in FIGS. 5 and 6, primary bolt 40 includes head 66, externally threaded portion 41, and through hole 58 that is adapted to receive compression bolt 52. Primary bolt 40 also has an unthreaded lower end 60 below externally threaded portion 41. Jam nut 48 is internally threaded so as to be adapted to be threaded onto externally threaded portion 41 of primary bolt 40. Compression spring 50 is adapted to be placed over lower end 60 of primary bolt 40. Compression bolt 52 has a threaded end portion 62 and a head 64, and end nut 54 is internally threaded so as to be adapted to be threaded onto end portion 62 of compression bolt 52. Bolt foot 56 is provided with threaded hole 68 that is adapted to receive a portion of threaded end portion 62 of compression bolt 52 that extends past end nut 54. In other embodiments of the invention, end nut 54 and bolt foot 56 may be replaced by an end nut (not shown) having a larger lower surface area than end nut 54. In yet other embodiments of the invention, the bolt foot can be replaced by a washer that is large enough to allow the application of the compression force onto a suitable surface area of heating element 36.

An advantage to the preferred embodiment of compression bolt assembly 42 that is illustrated in the drawings is that the preferred compression bolt assembly may be fully assembled and then threaded into hole 38. This advantage arises because the outer dimensions of spring 50, end nut 54 and bolt foot 56 in the preferred embodiment are smaller than the inside diameter of threaded hole 38. Consequently, no part of this preferred assembly must be accessed from below the upper screed plate, and therefore, it is easier to install and use. In this preferred embodiment of the invention, jam nut 48 is threaded onto externally threaded portion 41 of primary bolt 40, and compression bolt 52 is placed through hole 58 in the primary bolt. Compression spring 50 is placed over lower end 60 of primary bolt 40 and threaded end portion 62 of compression bolt 52 that extends out of lower end 60 of the primary bolt. End nut 54 is then threaded onto threaded end portion 62 of the compression bolt until a portion of threaded end portion 62 extends past or below end nut 54. Bolt foot 56 is then threaded onto the part of end portion 62 of the compression bolt that extends past or below end nut 54. End nut 54 is then threaded downwardly, until its lower surface contacts and bears against the upper surface of bolt foot 56. The assembled compression bolt assembly 42, as shown in FIG. 4, is then placed into threaded hole 38 and the threaded portion of primary bolt 40 is threaded into hole 38 until the bolt foot contacts the heating element. If jam nut 48 is in contact with upper screed plate 34, it should be loosened at this stage to back it off of contact with the upper screed plate. Head 66 of primary bolt 40 may then be engaged to further thread the primary bolt through threaded hole 38 by an amount determined to compress spring 50 to provide the predetermined desired compression force on heating element 36. As spring 50 is compressed, head 64 of compression bolt 52 will back out of contact with head 66 of primary bolt 40. Then, jam nut 48 may be threaded further onto the primary bolt until it contacts the upper screed plate to lock the compression bolt assembly in place on the upper screed plate. The progression of these last steps is illustrated by a comparison of the compression bolt assembly shown on the right side of FIG. 2 with the compression bolt assembly shown immediately to its left.

The inventor has found that good results may be obtained when spring 50 is selected so that when fully compressed, it will provide 22.00 pounds/inch of compression force, and that spring 50 is compressed according to the invention so as to apply a compression force within the range of 8-11 pounds/inch to the heating element on the lower screed plate. The inventor has found that when spring 50 is selected as described above, a preferred compression force of 9.6 pounds/inch may be obtained when the gap "X", shown in FIG. 2, is measured between head 64 of compression bolt 52 and head 66 of primary bolt 40 as 7/16 inch. This gap "X" may then provide a visual indication that the compression bolt assembly has been employed to provide the desired compression force. This visual indicator may also be used to insure that all of the compression bolt assemblies in the screed assembly are installed in such a way as to insure that the desired compression force is applied through each compression bolt assembly.

Although this description contains many specifics, these should not be construed as limiting the scope of the invention, but as merely providing illustrations of the presently preferred embodiment thereof, as well as the best mode contemplated by the inventor of carrying out the invention. The invention, as described herein, is susceptible to various modifications and adaptations, as would be understood by those having ordinary skill in the art to which the invention relates.

What is claimed is:

1. A screed assembly for an asphalt paving machine comprising:
   (a) a lower screed plate;
   (b) an upper screed plate;
   (c) a heating element that is in contact with the lower screed plate;
   (d) a compression bolt assembly comprising:
      (i) a primary bolt having a primary bolt through hole;
      (ii) a compression bolt that is adapted to be inserted through the primary bolt through hole;
      (iii) a compression spring that is adapted to be placed over the lower end of the primary bolt;
      wherein said compression bolt assembly is adapted to cooperate with the upper screed plate to apply a compression force to the heating element on the lower screed plate.

2. The screed assembly of claim 1 wherein:
   (a) the upper screed plate has a hole;
   (b) the compression bolt assembly is adapted to be inserted into the hole in the upper screed plate and into contact with the heating element so as to apply a compression force thereto without requiring access to any part of the compression bolt assembly from below the upper screed plate.

3. The screed assembly of claim 1 which includes:
   (a) a plurality of compression bolt assemblies;
   (b) four holes spaced across the length of the upper screed plate, with each of said holes being adapted to receive a primary bolt of one of the plurality of compression bolt assemblies.

4. The screed assembly of claim 1 which includes:
   (a) twelve compression bolt assemblies;
   (b) three groups of four holes each that are spaced across the width of the upper screed plate, with each of said holes being adapted to receive a primary bolt of one of the compression bolt assemblies.

5. The screed assembly of claim 4 wherein:
   (a) the first group of four holes is located near the left side of the heating element;
   (b) the second group of four holes is located near the right side of the heating element;
   (c) the third group of four holes is located in the middle of the heating element.

6. The screed assembly of claim 1:
   (a) which includes a threaded hole in the upper screed plate;
   (b) wherein the primary bolt has an externally threaded portion that is adapted to thread into said threaded hole in the upper screed plate.

7. A screed assembly for an asphalt paving machine comprising:
   (a) a lower screed plate;
   (b) a heating element that is in contact with the lower screed plate;
   (c) an upper screed plate which includes a threaded hole;
   (d) a compression bolt assembly that is adapted to cooperate with the upper screed plate to apply a compression force to the heating element on the lower screed plate, said compression bolt assembly comprising:
      (i) a primary bolt having a primary bolt through hole, a head and an externally threaded portion that is adapted to thread into the threaded hole in the upper screed plate;
      (ii) a compression bolt that has a head and a threaded end portion and is adapted to be inserted through the primary bolt through hole;
      (iv) a jam nut that is adapted to be threaded onto the externally threaded portion of the primary bolt;
      (iii) a compression spring that is adapted to be placed over the lower end of the primary bolt and the lower end of the compression bolt;
      (v) an end nut that is adapted to be threaded onto the end portion of the compression bolt.

8. The screed assembly of claim 7 wherein the compression bolt assembly further includes a bolt foot that is provided with a threaded hole, said threaded hole being adapted to receive a part of the threaded end portion of the compression bolt that extends through the end nut.

9. A method for applying a predetermined compression force to a heating element of a screed assembly for an asphalt paving machine, said screed assembly comprising an upper screed plate having a threaded hole and a lower screed plate on which the heating element is placed, wherein said method comprises:

(a) placing the heating element into contact with the lower screed plate;
(b) providing a compression bolt assembly comprising the following components:
  (i) a compression bolt having a head and an externally threaded end portion;
  (ii) a primary bolt having a head, an externally threaded portion that is adapted for threaded engagement with the threaded hole in the upper screed plate, and a primary bolt through hole that is adapted to receive the compression bolt;
  (iii) a jam nut that is adapted for threaded engagement with the externally threaded portion of the primary bolt;
  (iv) a compression spring;
  (v) an end nut that is adapted for threaded engagement with the externally threaded end portion of the compression bolt;
  (vi) a bolt foot having an upper end which includes a threaded hole that is adapted for threaded engagement with the threaded end portion of the compression bolt;
(c) assembling the compression bolt assembly so that the compression bolt extends through the hole in the primary bolt, the compression spring is placed over the end of the compression bolt extending out of the lower end of the primary bolt, the end nut is threaded onto the end portion of the compression bolt so that a portion of the threaded end portion of the compression bolt extends below the end nut, the bolt foot is threaded onto the end portion of the compression bolt that extends below the end nut, and the jam nut is threaded onto the primary bolt;
(d) inserting the primary bolt into the threaded hole in the upper screed plate;
(e) threading the primary bolt into the threaded hole in the upper screed plate until the bolt foot contacts the heating element;
(f) threading the primary bolt further into the threaded hole in the upper screed plate to compress the spring to provide the predetermined compression force on the heating element;
(g) threading the jam nut further onto the primary bolt until the jam nut contacts the upper screed plate to lock the compression bolt assembly onto the upper screed plate.

10. The method of claim 9 which includes providing a compression bolt assembly that is adapted to provide a predetermined compression force on the heating element that is within the range of 8-11 pounds/inch.

11. The method of claim 9 which includes measuring the gap between the head of the compression bolt and the head of the primary bolt to provide a visual indication that the compression bolt assembly has been employed to provide the predetermined compression force.

* * * * *